United States Patent [19]
Lee

[11] Patent Number: 5,796,786
[45] Date of Patent: Aug. 18, 1998

[54] PHASE ERROR DETECTING METHOD AND PHASE TRACKING LOOP CIRCUIT

[75] Inventor: Myeong-hwan Lee, Suwon, Rep. of Korea

[73] Assignee: Samsung Electronics Co., Ltd., Kyungki-do, Rep. of Korea

[21] Appl. No.: 733,569

[22] Filed: Oct. 18, 1996

[30] Foreign Application Priority Data

Oct. 18, 1995 [KR] Rep. of Korea ............... 95-36047

[51] Int. Cl.⁶ ................................................. H04L 27/14
[52] U.S. Cl. ......................... 375/326; 375/340; 375/344; 375/346; 348/607; 348/639; 348/726; 329/304
[58] Field of Search ........................... 348/638, 639, 348/725–727; 375/232, 235, 261, 264, 270, 279–281, 284, 287, 321, 324–326, 329, 332, 340, 344, 346, 349, 371, 373; 329/304, 306, 307, 347, 357, 358–360, 371; 455/204

[56] References Cited

U.S. PATENT DOCUMENTS

| | | | |
|---|---|---|---|
| 5,406,587 | 4/1995 | Horwitz et al. | 375/346 |
| 5,519,356 | 5/1996 | Greenberg | 329/304 |
| 5,602,601 | 2/1997 | Kim et al. | 348/607 |

*Primary Examiner*—Don N. Vo
*Assistant Examiner*—Amanda T. Le
*Attorney, Agent, or Firm*—Sughrue, Mion, Zinn, Macpeak & Seas, PLLC

[57] ABSTRACT

A phase error detecting method is applied to a VSB receiver or a QAM receiver. Q-channel data is recovered by digitally filtering transmitted I-channel data, and the phases of the I-channel data and the Q-channel data are corrected according to a fed-back phase error. A decided I-channel level value is chosen approximating the phase-corrected I-channel data among predetermined reference I-channel level values. A phase error value for the received data is obtained by subtracting the decided I-channel level value from the phase-corrected I-channel data, and multiplying the sign of the difference by the difference itself, and applying a weight value from a predetermined weighting function to the phase error value weighted phase error value is fed back to be used for phase correction of received data. Thus, the reliability of phase error detection can be increased by use of the weighting function.

18 Claims, 7 Drawing Sheets

PHASE ERROR DETECTING METHOD AND PHASE TRACKING LOOP CIRCUIT

BACKGROUND OF THE INVENTION

The present invention relates to a phase error detecting method and a circuit for implementing the method in a digital demodulation system. More particularly, the present invention relates to a method for detecting a phase error produced during demodulation in a receiver employing a digital vestigial sideband (VSB) system or a quadrature amplitude modulation (QAM) system, and a circuit suitable for implementing the phase error detecting method.

A significant amount of effort has been expended in developing a television having a large screen and high resolution. As a result of such effort, a high definition television (HDTV) receiver for receiving HDTV signals has been produced in Japan. Furthermore, the HDTV signals are broadcast in an analog transmission mode in accordance with a multiple sub-Nyquist sampling encoding (MUSE) process.

In the United States, the Grand Alliance (GA) committee has proposed technical standards for designing a HDTV system. Specifically, the GA committee has adopted vestigial side band (VSB) modulation as a GA-HDTV modulation standard. The VSB modulation system has been used to modulate analog video signals in standard television broadcasts, also. An earlier digital spectrum compatible HDTV employed a 2-VSB modulation system using two levels or a 4-VSB modulation method using four levels. In contrast, the GA-HDTV employs an 8-VSB modulation system using eight levels for a terrestrial broadcast mode and a 16-VSB modulation system using sixteen levels for a high-speed cable mode.

The GA committee has also proposed the configuration of a receiver for demodulating a VSB signal. The proposed receiver is characterized in that data is detected by using only an in-phase I-channel signal and the sampling is performed at a symbol rate, in contrast with other digital demodulators. As a result, the VSB receiver can be implemented in simpler hardware than other receivers, e.g., a QAM receiver which uses the quadrature Q-channel as well as the I-channel. Furthermore, since the sampling is performed at a symbol rate, the VSB receiver can detect data even though its processing speed is relatively low compared with a fractional rate receiver.

The VSB receiver adopts a coherent detection method in which a modulated signal is demodulated by recovering a carrier. The advantage of the coherent detection method over an incoherent detection method is that data can be detected with lower error rate under the same signal-to-noise ratio. However, a distinct drawback of a carrier recovering circuit (which is used according to the coherent detection method) is that it adds to the structural complexity of the receiver.

To achieve coherent detection in the VSB receiver, phase detection of a transmission signal is performed in two steps, one of which occurs in a frequency phase locked loop (FPLL) and the other in a phase tracking loop (PTL).

The FPLL estimates the phase of a transmitted VSB signal by using a pilot signal included in the VSB signal. This FPLL is easy to realize with a conventional PLL frequency error detection circuit, which is disclosed in *Grand Alliance HDTV Specification* by the GA-HDTV committee, February 1994. The phase tracking loop (PTL) circuit receives as an input the signal output by the FPLL through a channel equalizer, to eliminate residual noise imposed on the phase, that is, a phase error which has not been entirely removed by the FPLL. The configuration of the FPLL in the GA-HDTV receiver is almost the same as that of a decision directed carrier recovery (DDCR) device disclosed in *Digital Communication* by E. A. Lee and D. G. Messerschmitt (Kluwer Academic Publishers, Boston, Mass., 1988) except that the former estimates the rotational components of signal points by using the sampling data of an I-channel only and thus compensates the value of a phase error.

The I-channel data includes the information to be transmitted. Though a Q-channel has no function of transmitting the information, it reduces the spectrum of a modulated signal. When a phase error takes place during demodulation, however, a Q-channel signal as well as an I-channel signal are to be included in the sampling data of the I-channel. This implies that the data of the Q-channel is also needed for compensation of a phase error in a PTL circuit. The Q-channel data can be obtained by Hilbert-transforming of the I-channel data.

Figure 1:
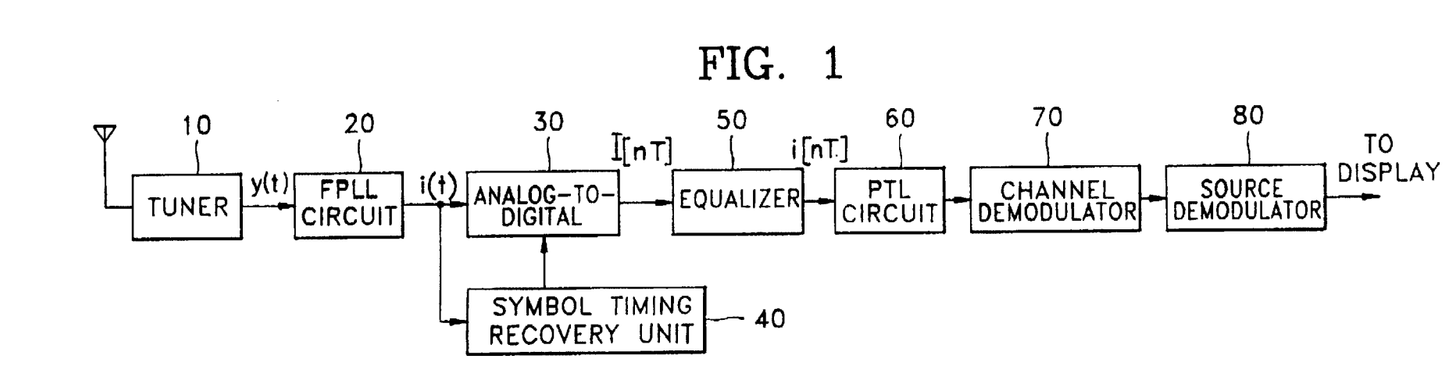
FIG. 1 is a block diagram of a general GA-HDTV receiver to which the present invention is applied.

FIG. 1 is a block diagram of the GA-HDTV receiver according to the GA-HDTV standard. Referring to FIG. 1, the GA-HDTV receiver employing the VSB modulation system will be described.

First, a tuner 10 receives a signal from an antenna. Here, the VSB signal y(t) output from the tuner 10 is expressed as $$y(t)=\bar{x}(t)e^{j(\omega_c t+\theta(t))} \quad (1)$$

where $e^{j\omega_c t}$ indicates a complex exponential carrier, $\omega_c$ indicates the carrier frequency, $\theta(t)$ indicates the phase of the carrier, and $\bar{X}(t)$ indicates a complex signal with a real component $X_r$ and an imaginary component $X_i$. That is, $$\bar{x}(t)=x_r(t)+jx_i(t) \quad (2)$$

An FPLL 20 recovers a carrier $e^{j\omega_c t}$ by using the pilot signal included in the VSB signal received from the tuner 10, and multiplies the VSB signal by complex exponential $e^{j\omega_c t}$, to obtain a baseband signal i(t) as follows:

$$i(t)=x_r(t)\cos\theta(t)-x_i(t)\sin\theta(t) \quad (3)$$

On the other hand, a Q-channel component q(t) is expressed as:

$$q(t)=x_r(t)\sin\theta(t)+x_i(t)\cos\theta(t) \quad (4)$$

$\theta(t)$ of equations (3) and (4) indicates the value of a phase error estimated in the FPLL 20. As described above, a residual phase component exists due to the phase error between the modulating carrier and the carrier of a recovered signal, which distorts the demodulated signal. Among the above signals, only the I-channel signal is used by the GA receiver for VSB modulation.

A symbol timing recovery (STR) unit 40 receives as an input the signal i(t) output by the FPLL 20, and recovers the symbol timing of the input signal to control the operational timing of an analog-to-digital converter 30. The analog-to-digital converter 30 inputs the signal i(t) output by the FPLL 20 and converts it into a digital signal I[nT] according to a symbol rate controlled by the symbol timing recovery unit 40.

The digital signal output from the equalizer 50 is given by $$i[nT]=x_r[nT]\cos(\theta[nT])-x_i[nT]\sin(\theta[nT]) \quad (5)$$

where it is assumed that equalization has an all pass characteristic.

Assuming that $\theta[nT]$ in equation (5) changes slowly, it can be regarded as a constant value for a few symbol time periods. The PTL 60 receives as its input an I-channel component of a signal demodulated by the carrier through the equalizer 50, and estimates the value of θ to compensate it.

However, since both $X_r$ and $X_i$ have non-zero values in the VSB modulation system, the phase error θ cannot be estimated only with the I-channel signal given in equation (5). Thus, the Q-channel component Q[nT] is necessary to estimate the phase error. Since, however, only the I channel signal is input to the PTL 60, the PTL 60 has to estimate Q channel signal from the I-channel signal I[nT] through a digital filter.

A channel demodulator 70 trellis-demodulates the output of the PTL 60, deinterleaves the trellis-demodulated data, and error-correction demodulates the cross-product data using a parity check.

A source demodulator 80 variable-length-demodulates the error-corrected and demodulated data output by the channel demodulator 70, inverse-quantizes it by a quantization step size used for coding, and restores original data through an inverse discrete cosine transformation (IDCT).

Figure 2:
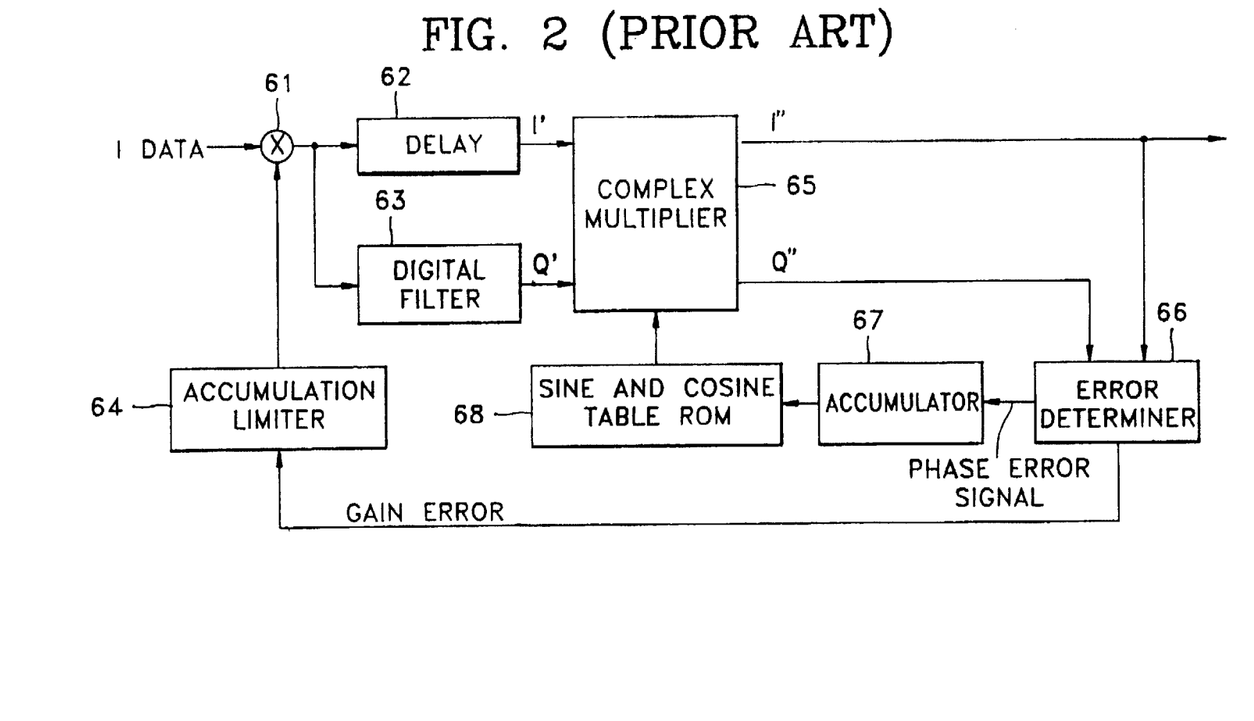
FIG. 2 is a block diagram of a conventional phase tracking loop circuit for use in the general receiver shown in FIG. 1.

FIG. 2 is a block diagram of a conventional PTL. Referring to FIG. 2, a digital filter 63, which is a Hilbert transform filter, filters I channel data output from a multiplier 61 and outputs Q' which is the reconstructed Q channel signal. The I-channel component and the Q-channel component of a VSB signal have the following relationship:

$$X_r * h_{vsb} = X_i \tag{6}$$

where $h_{vsb}$ is the impulse response of a cascade connection of a Hilbert transform filter and a high-pass filter. The high-pass filter ensures the existence of a vestigial sideband in the spectrum of a VSB-modulated signal. The vestigial sideband occupies 0.31 MHz in the spectrum of the VSB signal adopted in the GA-HDTV. Also, the bandwidth of the baseband VSB signal is 5.59 MHz. Thus, the vestigial sideband occupies just a small bandwidth compared with the baseband signal. It can be said that an error involved in approximating the VSB signal spectrum to the spectrum of a single-sideband (SSB) signal is negligible. In this case, $h_{vsb}$ is approximated to an impulse response $h_H$ of the Hilbert transform filter. Since the Hilbert transform serves to shift the phase of a signal by 90°, the following relationship is established between $X_r$ and $X_i$.

$$x_r * h_H = x_i \tag{7}$$

$$x_i * h_H = -x_r \tag{8}$$

In the case where a change of θ[nT] is very small, each term in equation (5) satisfies, respectively, $$x_r \cos θ * h_H = x_i \cos θ \tag{9}$$

$$x_i \sin θ * h_H = -x_r \sin θ \tag{10}$$

Therefore, $$I * h_H = x_i \cos θ + x_r \sin θ \tag{11}$$
$$= Q$$

On the other hand, a transmitted signal $x_r + jx_i$ has the following relationship with the signal I+jQ including a phase error:

$$e^{jθ}(x_r + jx_i) = I + jQ \tag{12}$$

Therefore, $$\cos θ + j \sin θ = \frac{(I + jQ)(x_r - jx_i)}{x_r^2 + x_i^2} \tag{13}$$

Considering imaginary components of each side in equation (13), $$\sin θ = \frac{x_r Q - x_i I}{x_r^2 + x_i^2} \tag{14}$$

Therefore, when θ[nT] is small, the phase error is calculated by $$θ = \sin^{-1} \frac{x_r Q - x_i I}{x_r^2 + x_i^2} \tag{15}$$
$$\cong \frac{x_r Q - x_i I}{x_r^2 + x_i^2}$$

However, the exact values of $x_r$ and $x_i$ are unknown and thus must be estimated. When θ is small in equation (5), the value of the I signal is approximate to the value of $x_r$. Then, the value of the I signal becomes the estimated value of $x_r$. On the other hand, when both sides of equations (5) and (11) are squared and added, respectively, we obtain the following equation which is independent of θ.

$$I^2 + Q^2 = x_r^2 + x_i^2 \tag{16}$$

Therefore, the estimated value $\hat{x}_i$ of $x_i$ is obtained by $$\hat{x}_i = \pm \sqrt{I^2 + Q^2 - \hat{x}_r^2} \tag{17}$$

When θ is small, we can see in equation (12) that the magnitude of Q is approximately that of $\hat{x}_i$. In addition, the sign of $\hat{x}_i$ is determined to be the same as that of Q. That is, $$\hat{x}_r = I \tag{18}$$

$$\hat{x}_i = sgn(Q) \cdot |x_i| \tag{19}$$
$$= sgn(Q) \cdot \sqrt{I^2 + Q^2 - \hat{x}_r^2}$$

In the above expressions, the notation [nT] for discrete-time variable has been omitted for simplicity.

Thus, a phase error can be obtained by using equation (15). The phase error is accumulated in an accumulator 67. A sine and cosine table ROM 68 outputs sine and cosine values corresponding to the mean value of the accumulated phase error signal. Residual phase components are eliminated by repeating the above procedure.

The performance of the PTL 60 depends predominantly on a method for detecting a phase difference between an input signal and a signal generated in the PTL 60. However, since the GA-HDTV adopts a multi-level VSB modulation system (i.e., eight levels for a terrestrial broadcast and sixteen levels for a cable broadcast), the PTL operates in a decision direct (DD) system, and the accuracy of decision determines the linear operation range of the PTL. That is, since the PTL utilizes only the I-channel signal to determine the value of $X_r$, the linear operation range of phase detection depends on a decided phase error. When the error determination is incorrect, the operation of the PTL becomes unstable.

In other words, since only the value of an I-channel signal is used to determine the value of $x_r$, the slope at each determined signal point becomes gentle as the residual phase value in the PTL increases and the slope reclines. Therefore, an accurate decision is difficult to obtain with a decision area as indicated by slender dot-shaded areas in FIG. 3.

Figure 3:
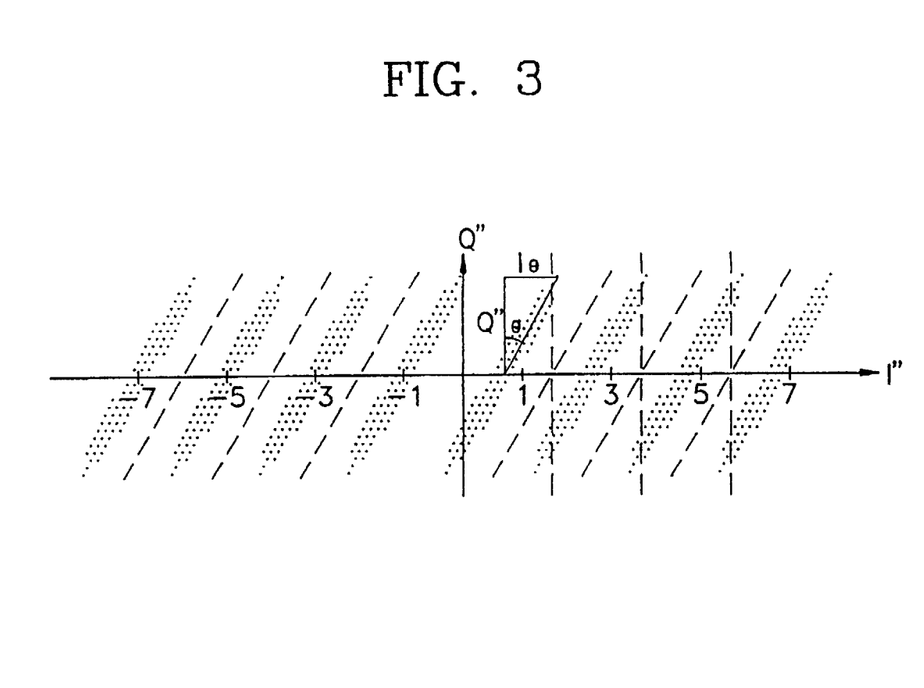
FIG. 3 is a diagram showing the scattering input signals in a conventional phase tracking loop circuit.

To circumvent this problem, a PTL of an adaptive DD method has been suggested with respect to a decision area having an inclination as indicated by oblique lines of FIG. 3 using a Q-channel signal as well as an I-channel signal for an optimum decision.

This PTL detects a phase error according to equations.

$$\theta = \arctan\left(\frac{I_e}{Q''}\right) \quad (20)$$

where $$I_e = I'' - \hat{I} \quad (21)$$

Here, I'' is phase-corrected I channel data and $\hat{I}$ is a decided I channel level value.

While a PTL employing a fixed DD system is likely to make an incorrect decision even with a small residual phase error due to a fixed decision area, the adaptive DD type PTL adaptively decides the level of a symbol beyond the conventional fixed decision area by using the slope obtained from equation (20), thus reducing operation errors caused by an incorrect decision. However, the PTL employing the adaptive DD system also has the drawback that an incorrect slope entails errors and a complex process is required to obtain an accurate slope.

Further, in some cases, because of a wide distribution of input symbols caused by noise and an excessively large phase error value, a correct inclination cannot be obtained.

Accordingly, an elaborate digital filter is needed for estimating the value of Q in the PTL of the adaptive DD system. Furthermore, additional components and algorithms for performing the arctangent operation impose many constraints on implementation of the PTL.

SUMMARY OF THE INVENTION

To overcome the above problems, it is an object of the present invention to provide a method for detecting a phase error by varying weights with decision areas.

It is another object of the present invention to provide a method for detecting a phase error in a VSB receiver, in which the reliability of error detection is increased by adjusting a weighting function applied to a phase error obtained by means of a transmitted training sequence.

It is still another object of the present invention to provide a method for detecting a phase error by varying weights with decision areas, in a QAM receiver.

It is a further object of the present invention to provide a phase tracking loop which can implement the above methods, in a VSB receiver.

To achieve the above objects, there is provided a phase error detecting method in a communication device of a digital VSB modulation system, which includes the steps of: (a) recovering Q-channel data by digitally filtering transmitted I-channel data; (b) correcting the phases of the I-channel data and the Q-channel data by a predetermined weighted phase error; (c) deciding an I-channel level value closest to the phase-corrected I-channel data among predetermined I-channel level values; (d) obtaining a phase error value by subtracting the decided I-channel level value from the phase-corrected I-channel data, and multiplying the subtracted result by the sign of the subtracted result; and (e) multiplying a weight value according to a predetermined weighting function by the phase error value to feed back the weighted phase error value to the step (b).

There is also provided a phase tracking loop in a communication device of a digital VSB modulation system, which includes the following structures: means for recovering Q-channel data by digital-filtering transmitted I-channel data; means for correcting the phases of the I-channel data and the Q-channel data by a predetermined weighted phase error value; means for estimating an I-channel level value closest to the phase-corrected I-channel data among predetermined I-channel level values; and means for detecting the difference between the phase-corrected I-channel data and the estimated I-channel level value, multiplying the difference by the sign of the difference to get a phase error value, applying a weight according to a predetermined weighting function to the phase error value, and feeding back the weighted phase error value to the phase-correcting means.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 4:
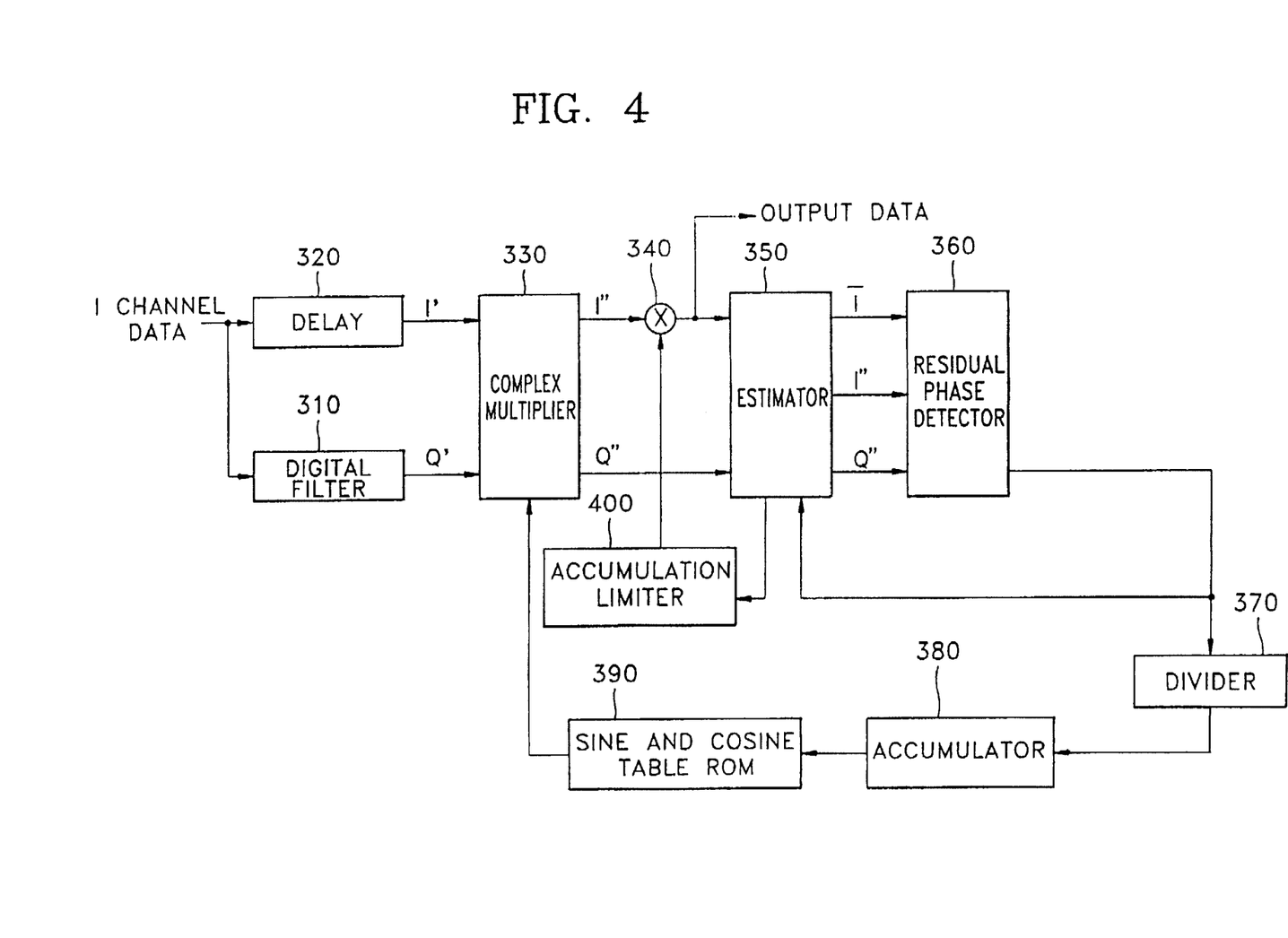
FIG. 4 is a schematic block diagram of a phase tracking loop circuit according to the present invention.

FIG. 4 shows a PTL according to a preferred embodiment of the present invention. The PTL comprises a digital filter 310, a delay 320, a complex multiplier 330, a multiplier 340, an estimator 350, a residual phase detector 360, a divider 370, an accumulator 380, a sine and cosine table ROM 390, and an accumulation limiter 400.

The digital filter 310 Hilbert-transform filters I-channel data and outputs Q'-channel data.

The delay 320 receives I-channel data as an input, delays the data for the filtering time required by the digital filter 310, and outputs I'-channel data.

The complex multiplier 330 complex-multiplies I'-channel data and Q'-channel data with sign and cosine values corresponding to a phase error detected by the phase tracking loop, respectively, and outputs phase-corrected I'' and Q''-channel data.

The multiplier 340 multiplies the I''-channel data with an accumulation limiting value output by the accumulation limiter 400, and outputs the multiplied data in a data sequence.

The estimator 350 inputs the Q''-channel data, the I''-channel data, which has been corrected in the multiplier 340, and a residual phase error. The estimator 350 then estimates the value $\hat{I}$ approximate to the I''-channel data, and outputs the estimated value Î, the I"-channel data, and the Q"-channel data.

The residual phase detector 360 detects the residual phase θ from the received Î, the I"-channel data, and the Q"-channel data. The detector 360 then applies a weight factor obtained from a predetermined weighting function to the detected residual phase θ. The divider 370 divides the received residual phase θ, which has been multiplied with the weight factor, by a predetermined divisor M so that the phase tracking loop may not diverge, and outputs the result as the value of a phase error.

The accumulator 380 accumulates the phase error value output from the divider 370.

The sine and cosine table ROM 390 outputs sine and cosine values corresponding to the accumulated value output from the accumulator 380.

The accumulation limiter 400 receives Î and the I"-channel data, and generates the value of I"-Î as an accumulation limiting value. The accumulation limiting value is limited to an approximate value within a predetermined limit range of 0.8–1.2 when the absolute value of the I"-channel data is a predetermined value or above. That is, when the absolute value of the I"-channel data is judged to be at the maximum level, the accumulation limiting value is so limited. The accumulation limiting value is output by limiter 400 to the multiplier 340.

The operation of the PTL described in FIG. 4 will be described in connection with FIG. 1.

A received signal is initially demodulated by the FPLL 20 of FIG. 1 in a GA-HDTV receiver. The demodulated signal is converted into a digital signal by the analog-to-digital converter 30 at a symbol rate controlled by the symbol timing recovery 40. The digital signal is input to the PTL of FIG. 4 through the equalizer 50.

In FIG. 4, since only the I-channel component of the digital signal is input to the PTL, Q-channel information is needed to extract phase information and correct a phase error. Thus, a Q-channel signal is recovered using the I-channel signal in the digital filter 310.

That is, the digital filter 310 Hilbert-transform filters the I-channel data received from the equalizer 50, and recovers the Q'-channel data. The delay 320 delays the I-channel data received from the equalizer 50 for a period equivalent to the filtering time of the digital filter 310, and outputs the I'-channel data.

The complex multiplier 330 complex-multiplies the I'-channel data and the Q'-channel data with sine and cosine values, respectively, corresponding to a phase error detected by the residual phase detector 360, and outputs phase-corrected I" and Q"-channel data. That is, the complex-multiplier 330 performs a phase-correction by subtracting the phase of the sine and cosine values generated in the PTL from the phase of the input I-channel signal which has passed through the delay 320, by means of the Q'-channel data.

The multiplier 340 multiplies an accumulation limiting value received from the accumulation limiter 400 with the I"-channel data, and outputs the corrected I"-channel data sequence to the channel demodulator 70 of FIG. 1.

The estimator 350 receives the corrected Q'-channel and I"-channel data from the multiplier 340, and estimates the value Î of the I-channel approximate to the I'-channel data using a the proportional value of a predetermined residual phase error (received from residual phase error detector 360). The estimator 350 outputs Î, the I"-channel data, and the Q"-channel data.

The residual phase detector 360 receives Î, the I"-channel data, and the Q"-channel data, detects the residual phase θ and applies a weight value obtained according to a predetermined weighting function to the detected θ value. The weighting function applies weight to the detected residual phase according to the reliability of the decision made.

A method for detecting a phase error using the residual phase detector 360 according to an embodiment of the present invention will be described.

In the present invention, since only the directionality of the Q"-channel value, i.e., the sign value of the Q" channel is used, the need for an elaborate digital filter is obviated. That is, a phase error is given by $$\theta = sgn(Q")(I"-\hat{I}) \tag{22}$$

Thus, the phase error is obtained by using only the error of the decided value of the I signal and the directionality of the Q"-channel data.

Equation (22) can be simplified to $$\theta = sgn(Q")sgn(I"-\hat{I}) \tag{23}$$

Therefore, with the use of only the directionalities of the I" and Q"-channel data, hardware implementation becomes simpler.

The residual phase detector 360 multiplies the phase error θ obtained from equations (22) or (23) by a weight obtained from a weighting function depending on the reliability of θ, and outputs the result.

Figure 5:
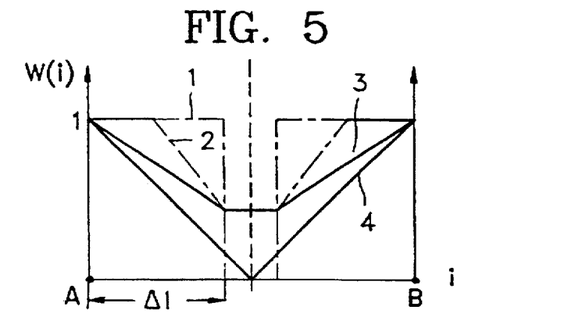
FIGS. 5 and 6A–6E show examples of weighting functions for use according to the present invention.

FIG. 5 illustrates four superimposed examples of weighting functions proposed in the present invention.

In FIG. 5, the level of an input signal I is decided to be either A or B according to the position of I along the "i" axis.

The conventional DD system decides the level of I by simply determining whether the position of I is closer to A or B. The phase error is estimated on the basis of this decision.

According to the conventional method, the levels of input signals may be decided incorrectly to be adjacent symbol levels when the magnitude of phase error is large. The incorrect decision leads to an incorrect phase error value, thus adversely influencing the PTL operation. In the present invention, stable operation of the PTL is achieved by applying a weighting function to the phase error value obtained in a conventional DD system. According to the weight function, weights vary with the positions of i between symbols A and B, thereby reducing wrong decisions and thus wrong phase error values.

Each of the weighting functions shown in FIG. 5 are illustrated individually in FIGS. 6A–6D, respectively. These weighting functions are easily modified into forms of constants, first-order equations, or higher-order equations. Further, the illustrated weighting functions are merely exemplary applications, and it is clear that any weighting function can be applied so long as it can reduce the wrong detection of a phase error caused by a decision error possibly generated in an adjacent area between symbols.

Figure 6A:
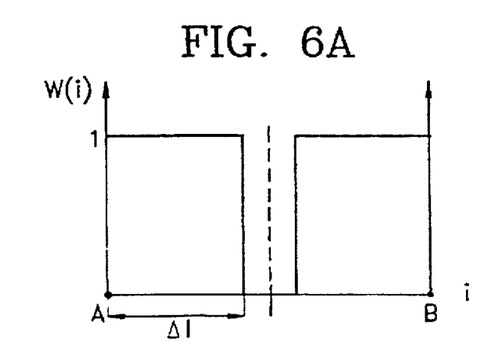

The expressions for respective weighting functions (wf) illustrated in FIGS. 6A–6D are as follows:

Weighting function 1 in FIG. 6A;

$$W(I) = \begin{cases} 1, & |I-\hat{i}| \leq \Delta I \\ 0, & \text{otherwise} \end{cases}$$

Figure 6B:
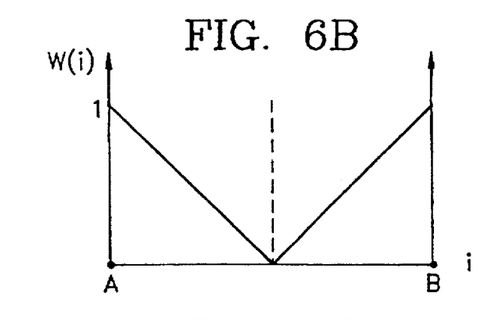

Weighting function 4 in FIG. 6B;

$$W(I) = 1 - |I - \hat{I}|$$
$$= 1 - (I - \hat{I}) \cdot sgn(I - \hat{I})$$

Figure 6C:
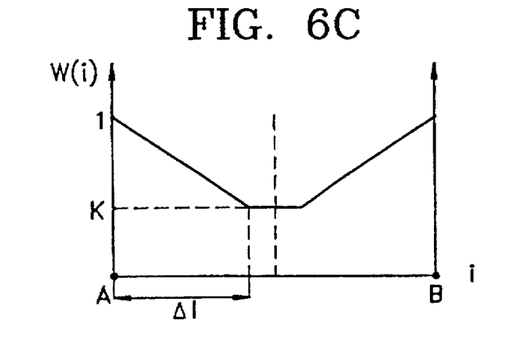

Weighting function 3 in FIG. 6C;

$$W(I) = \begin{cases} k, & |I - \hat{I}| \geq \Delta I \\ 1 + \dfrac{k-1}{\Delta I} \cdot |I - \hat{I}|, & \text{otherwise} \end{cases}$$

Figure 6D:
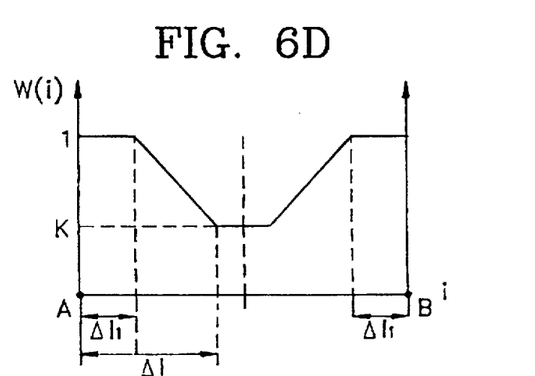

Weighting function 2 in FIG. 6D;

$$W(I) = \begin{cases} 1, & |I - \hat{I}| \leq \Delta I_1 \\ k, & |I - \hat{I}| \geq \Delta I \\ \dfrac{k-1}{\Delta I - \Delta I_1} \cdot |I \mp \Delta I_1 - \hat{I}| + 1, & \text{otherwise} \end{cases}$$

In weighting functions 1–4, $\hat{I}$ indicates a decided value and k is a real number between 0 and 1. Regarding the $\mp$ signs in weighting function 4, negative (–) sign is effective in the left side of the center of two adjacent decision levels, and positive (+) sign is effective in the right side.

Additionally, it is noted that the conventional function of DD is W(I)=1.

Figure 7A:
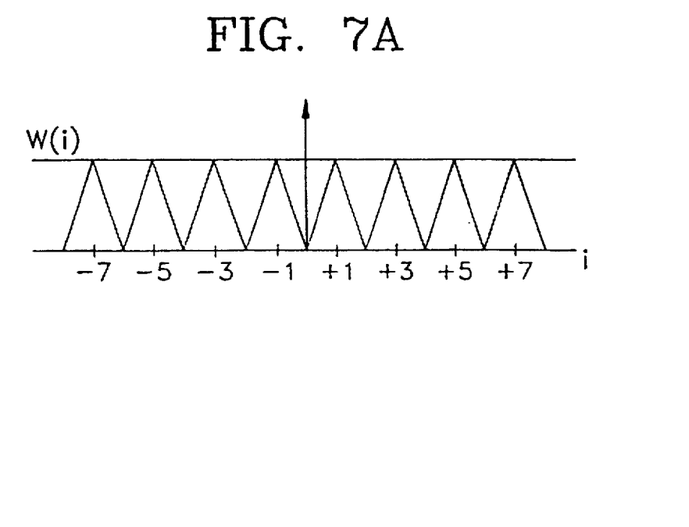
FIGS. 7A and 7B are examples of weighting functions applied to a VSB signal.
Figure 7B:
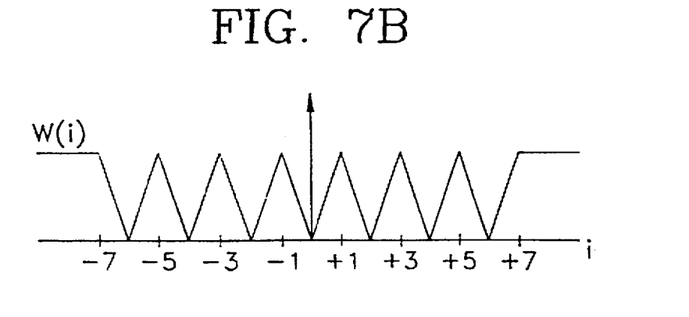

FIG. 7A illustrates an application of weighting function 2 of FIG. 6B to the GA-VSB. Further, FIG. 7B illustrates an improved weighting function, where a weight value of 1 is applied to symbol levels higher than +7 and lower than –7, since there is little possibility of a wrong decision at or beyond the maximum symbol level.

When, the divider 370 receives a weighted phase error from the detector 360, it is divided by a predetermined divisor M (e.g., 30), so as to prevent the phase tracking loop from diverging. The accumulator 380 accumulates the divided phase error values output from the divider 370, and outputs the accumulated values to the sine and cosine table ROM 390.

The sine and cosine table ROM 390, which contains sine and cosine values corresponding to each phase, outputs to the complex multiplier 330 the sine and cosine values corresponding to the output of the accumulator 380.

Meanwhile, the accumulator 380 multiplies the weighted phase error received from the divider 370 by an adequate gain $\alpha(\alpha \leq 1)$, and adds the result to the previous output value $\theta'_{n-1}$ according to the equation $$\theta'_n = \theta'_{n-1} + \alpha W(I_n)\theta_n \qquad (24)$$

where $\alpha$ is a value related to a bandwidth for phase-correction, $\theta'$ is a final residual phase error value, and $\theta$ is a decided phase error value. The variable n represents the present symbol interval, and n–1 is the previous symbol interval.

As a result, $W(I_n)$ functions like a filter for multiplying the phase error by a value depending on the value of I. Thus, the residual phase error converges smoothly as if it has passed through a low-pass filter. In other words, this filter performs a post-filtering of the phase error according to the reliability of the decision.

The accumulation limiter 400 receives $\hat{I}$ and I"-channel data from the estimator 350, generates difference value of I"-$\hat{I}$ as an accumulation limiting value. When the absolute value of the I"-channel data is a predetermined value, i.e., level 6 or above (when it is determined to be a maximum level), the accumulation limiter 400 limits the accumulation limiting value to an approximate value within the range of 0.8–1.2 and outputs the value to the multiplier 340.

The accumulation limiter 400 also outputs the difference value of I"-$\hat{I}$ as an accumulation limiting value to the multiplier 340, when the absolute value of the I" channel data is smaller than a predetermined value.

The simplest first-order loop has been taken as an example in FIG. 4, to describe the operation of the PTL using the phase error detecting method of the present invention. However, when a loop is of a higher-order, the simple accumulator is replaced with a higher-order filter.

In addition, the weighting functions of the present invention can be adaptively applied according to the channel states. That is, if a training sequence corresponding to two segments per frame (field sync segment) is transmitted, as in the GA-VSB, the reliability of a decision can be determined. Performance can also be improved since the weighting function can be adjusted according to the obtained reliability, and thus it is possible to adaptively apply the weighting function to a channel condition.

Figure 6E:
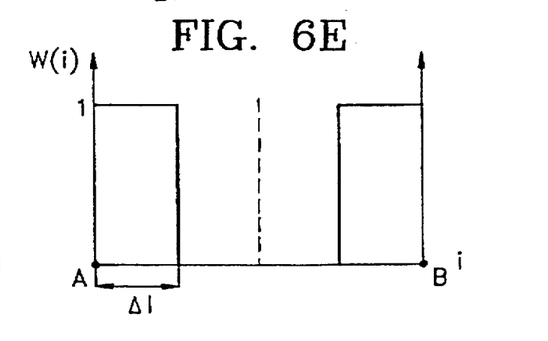

For instance, when function 1 of FIG. 6A has been applied and the decision error of the training sequence has increased, the decision cannot be relied on. Thus, it is preferable that, as shown in FIG. 6E, the value of $\Delta I$ be reduced and the gap of zero weighting between the symbols A and B be increased.

Figure 8:
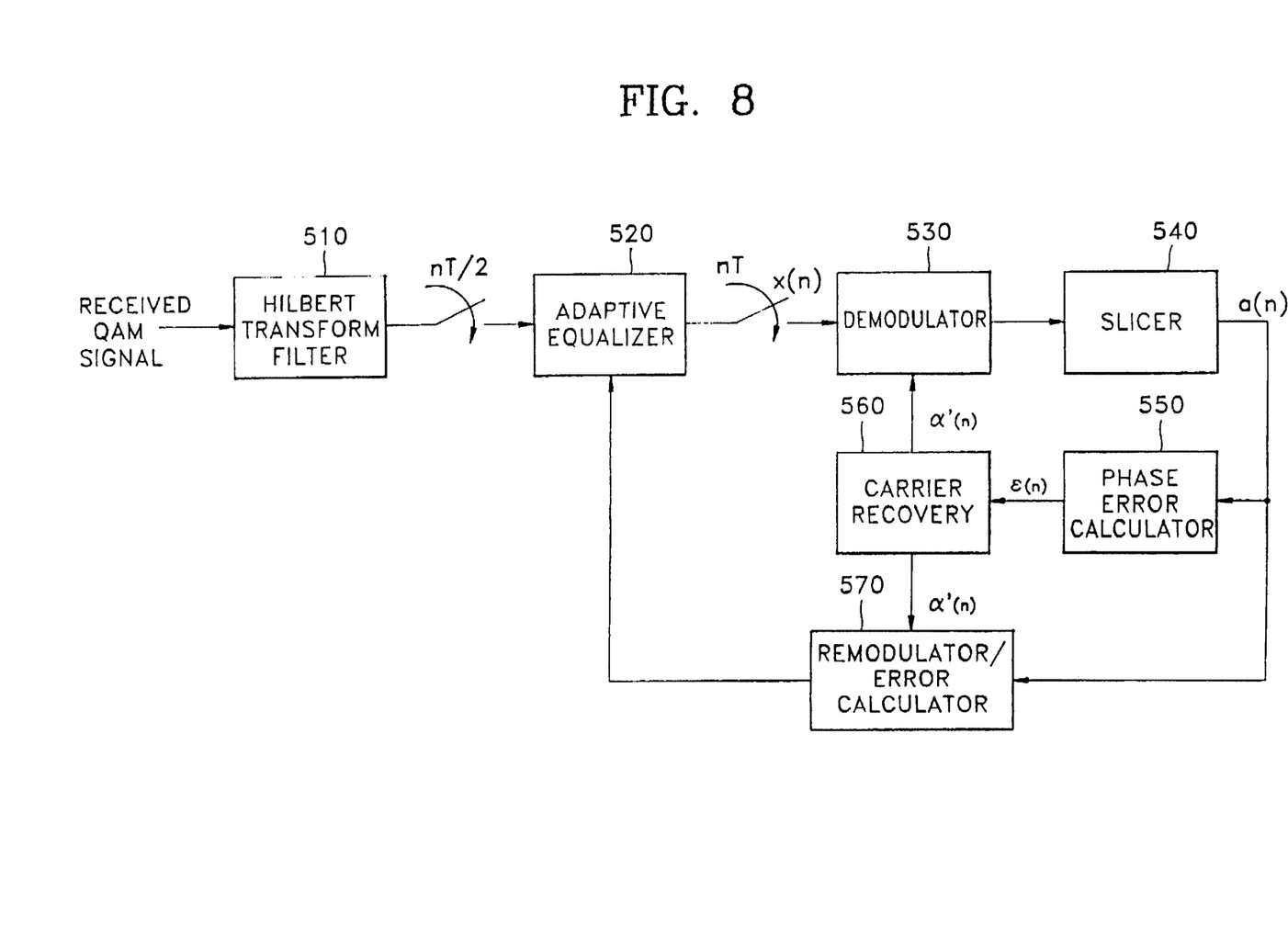
FIG. 8 is a block diagram of a QAM receiver according to the present invention.

FIG. 8 is a block diagram of a QAM receiver according to another embodiment of the present invention. The configuration and operation of a conventional QAM receiver is described in an article entitled "Adaptive Carrier Recovery Systems for Digital Data Communications Receivers" by R. L. Cupo and R. D. Gitlin (see: *IEEE Journal on Selected Areas in Communications,* December '89 issue, pp1328–1339).

In FIG. 8, a received QAM signal is just I-channel data. A Hilbert transform filter 510 recovers Q-channel data by filtering the I-channel data, and outputs the I and Q-channel data. An adaptive equalizer 520, which is a passband-type, removes ghost or noise included in the output of the Hilbert transform filter 510. The output x[nT] of the adaptive equalizer 520 is expressed as $$x[nT] = a[nT]e^{j(\omega_0 nT + \theta[nT])} + v[nT] \qquad (25)$$

where $a[nT] = a_r[nT] + ja_i[nT]$ is an (n–1)th transmitted symbol with in-phase data $a_r[nT]$ and quadrature phase data $a_i[nT]$, $\omega_0$ is the frequency of a transmitted carrier, T is a symbol period, $\theta[nT]$ is an uncorrected carrier phase, and v[nT] represents additive white Gaussian noise.

Here, the carrier phase error $\theta[nT]$ generally consists of three components: phase jitter, frequency offset, and phase offset.

The demodulator 530 multiplies the signal output from the equalizer 520 with the output of the carrier recovery 560, and outputs the multiplied value to a slicer 540.

Here, a phase error exists between the carrier of the received signal and the recovered carrier. Thus, the slicer 540 and the phase error calculator 550 estimate the phase error.

In the case where the slicer 540 has the decision area of a conventional fixed DD system, the slicer 540 decides the transmitted phase of the modulated signal, to be one of the reference phase ±45°, ±135° which is closest to the phase difference included in the output signal of the demodulator 530.

In the present invention however, the slicer 540 uses the decision area according to the weighting function of FIG. 6E. That is, the slicer 540 multiplies the phase difference included in the output signal of the demodulator 530 with the weight from a predetermined weighting function, and decides the transmitted phase to be the reference phase which is closest to the weighted phase difference.

The phase error calculator 550 outputs the estimate of the phase error $\epsilon(n)$ according to the reference phase output from the slicer 540.

The carrier recovery circuit 560 is a phase-locked loop (PLL) that generates a local carrier $\alpha'(n)$ identical to the modulating carrier according to the estimated value $\epsilon(n)$, and outputs the local carrier $\alpha'(n)$ to the demodulator 530 and a remodulator/error calculator 570 to detect an original signal.

The remodulator/error calculator 570 multiplies the signal output from the slicer 540 with the output signal of the carrier recovery 560, and outputs the multiplied value to the equalizer 520, since the adaptive equalizer 520 is a passband type.

The phase error detecting method of the present invention was described in terms of the QAM receiver in FIG. 8, but can also be applied to multiple phase shift keying (MPSK).

Figure 9:
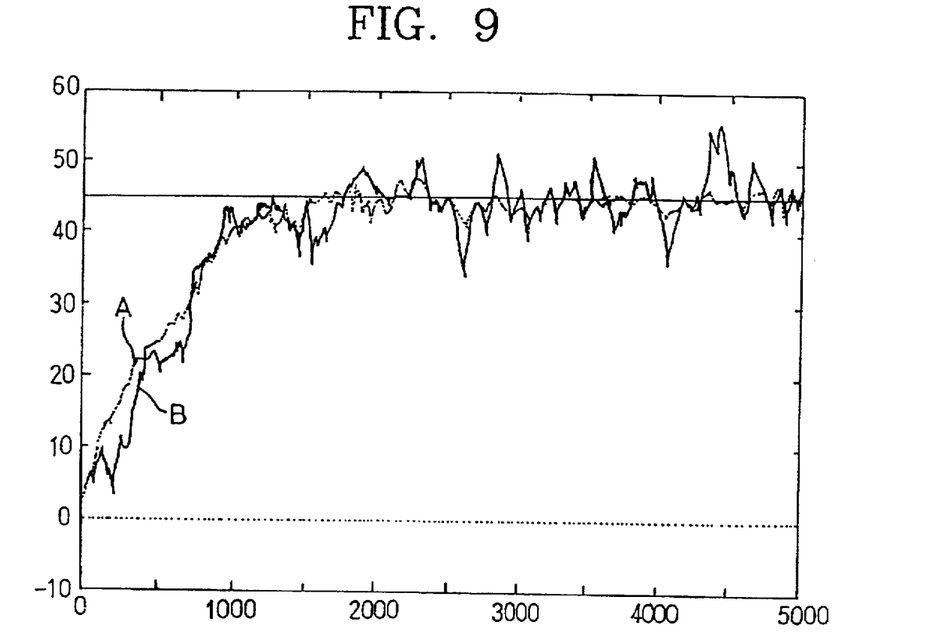
FIGS. 9 and 10 illustrate comparisons of the simulated convergence characteristics of circuits according to the present invention with those of the conventional method.

FIG. 9 illustrates the comparison of the simulated convergence characteristics of the PTL of the present invention (A) in FIG. 4 with that of the conventional fixed DD system (B) in the case where a phase error of 45° exists.

Figure 10:
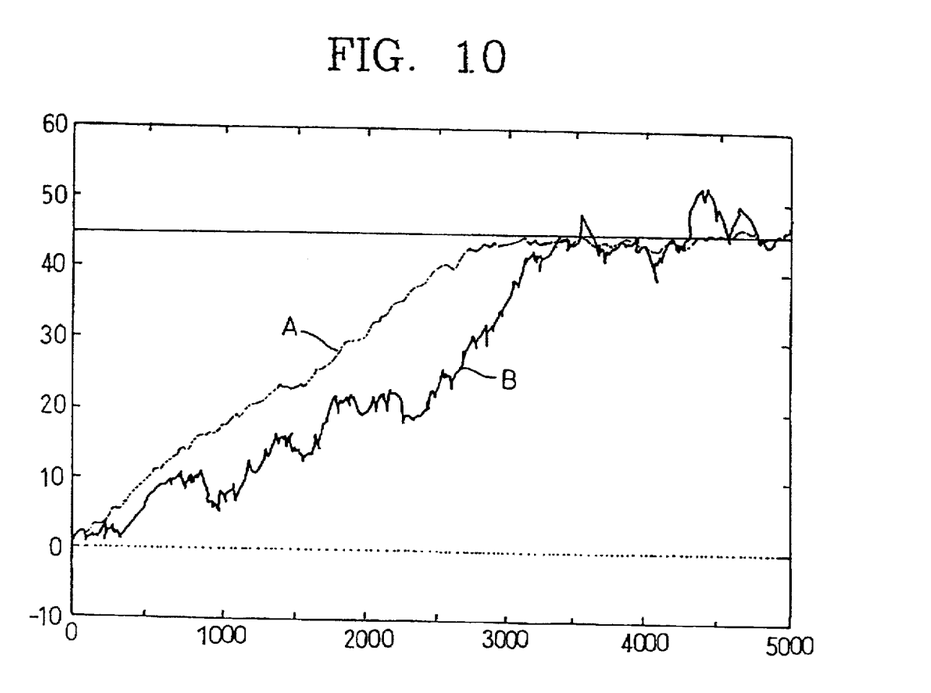

FIG. 10 illustrates the comparison of the simulated convergence characteristics of the QAM receiver of the present invention (A) with that of the conventional fixed DD system (B) in case where a phase error of 45° exists.

The weighting functions applied to FIGS. 9 and 10 are that shown in FIG. 6B.

As shown in FIGS. 9 and 10, phase error detecting method of the present invention (A) reveals much smaller fluctuations in convergence characteristics curve than that of the conventional one (B).

The phase error detecting method and the PTL of the present invention can easily be modified to deal with various cases of residual phase values. Most importantly, channel condition can be detected by using a transmitted training sequence corresponding to two segments per frame in the GA-HDTV to adjust a weighting function. As a result, the reliability of error detection can be increased.

Further, the phase error detecting method of the present invention can be used in all the decisions of PTL regardless of its configuration, and hardware implementation is facilitated. The present invention can also be easily applied to a receivers of QAM or MPSK system.

Although the present invention has been explained through illustrative preferred embodiments, it will be appreciated that various modifications and changes may be made to the described embodiments without departing from the spirit and scope of the present invention.

What is claimed is:

1. A phase error detecting method in a communication device of a digital VSB modulation system, comprising the steps of:
   (a) recovering Q-channel data by digitally filtering transmitted I-channel data;
   (b) correcting the phases of said I-channel data and said Q-channel data by a predetermined weighted phase error value to produce phase-corrected I-channel data and phase corrected Q-channel data;
   (c) deciding an I-channel level value closest to the phase-corrected I-channel data among predetermined I-channel level values;
   (d) obtaining a phase error value by subtracting the decided I-channel level value from said phase-corrected I-channel data, and multiplying the subtracted result by the sign of said phase-corrected Q-channel data; and
   (e) multiplying said phase error value by a weight value according to a predetermined weighting function W(I) to produce a weighted phase error value, and feeding back said weighted phase error value for use in step (b).

2. The phase error detecting method as claimed in claim 1, wherein said weighting function W(I) in said step (e) is expressed by the following equation:

$$W(I) = 1 - |I - \hat{I}| = 1 - (I - \hat{I}) \cdot sgn(I - \hat{I})$$

where $\hat{I}$ is a decided value and I is said phase-corrected I-channel data.

3. The phase error detecting method as claimed in claim 1, wherein said weighting function W(I) in said step (e) is expressed by the following equation:

$$W(I) = \begin{cases} k, & |I - \hat{I}| \geq \Delta I \\ 1 + \dfrac{k-1}{\Delta I} \cdot |I - \hat{I}|, & \text{otherwise} \end{cases}$$

where k is a real number between 0 and 1, $\hat{I}$ is a decided value, I is said phase-corrected I-channel data, and $\Delta I$ is an adjustable threshold value.

4. The phase error detecting method as claimed in claim 1, wherein said weighting function W(I) in said step (e) is expressed by the following equation:

$$W(I) = \begin{cases} 1, & |I - \hat{I}| \leq \Delta I_1 \\ k, & |I - \hat{I}| \geq \Delta I \\ \dfrac{k-1}{\Delta I - \Delta I_1} \cdot |I \mp \Delta I_1 - \hat{I}| + 1, & \text{otherwise} \end{cases}$$

where k is a real number between 0 and 1, $\hat{I}$ is a decided value, I is said phase-corrected I-channel data, and $\Delta I$ is an adjustable threshold value.

5. The phase error detecting method as claimed in claim 1, wherein said step (e) comprises the steps of:
   (e1) obtaining the reliability of decision using a training sequence included in said transmitted I-channel data;
   (e2) adjusting said weighting function according to said reliability; and
   (e3) multiplying said phase error value obtained in said step (d) by a weight value according to said adjusted weighting function to feed back said weighted phase error value to said step (b).

6. The phase error detecting method as claimed in claim 1, wherein said weighting function W(I) in said step (e) is expressed by the following equation:

$$W(I) = \begin{cases} 1, & |I - \hat{I}| \leq \Delta I \\ 0, & \text{otherwise} \end{cases}$$

where $\hat{I}$ is a decided value, I is said phase-corrected I-channel data, and $\Delta I$ is an adjustable threshold value.

7. A phase error detecting method in a demodulation device for demodulating a phase-modulated signal, comprising the steps of:
   (a) recovering a signal by digitally filtering a transmitted phase-modulated signal to produce a recovered signal;
   (b) multiplying a phase difference information included in the recovered signal by a weight value according to a predetermined weighting function to generate weighted phase difference information;

(c) deciding a transmitted phase information of said phase modulated signal to be one of predetermined reference phase values which is closest to said weighted phase difference information, thereby producing a decided phase information; and (d) correcting the phase of the recovered signal by the phase difference between said weighted phase difference information and the decided phase information.

8. A phase tracking loop in a communication device of a digital VSB modulation system, comprising:

means for recovering Q-channel data by digital-filtering transmitted I-channel data;

means for correcting the phases of said I-channel data and said Q-channel data by a predetermined weighted phase error value, to produce phase-corrected I-channel data and phase-corrected Q-channel data;

means for estimating an I-channel level value closest to the phase-corrected I-channel data among predetermined reference I-channel level values, to produce an estimated I-channel level value; and means for detecting the difference between said phase-corrected I-channel data and said estimated I-channel level value, multiplying said difference by the sign of said phase-corrected Q-channel data to produce a phase error value, applying a weight according to a predetermined weighting function to said phase error value and feeding back said weighted phase error value to said means for correcting the phases.

9. A phase tracking loop in a communication device of a digital VSB modulation system, comprising:

digital-filtering means for reconstructing first Q-channel data by filtering transmitted I-channel data;

delay means for delaying said I-channel data for a filtering time of said digital-filtering means to output the delayed I-channel data as first I-channel data;

first multiplying means for complex-multiplying said first I-channel data and said first Q-channel data by predetermined sine and cosine values, respectively, and outputting the multiplied values as second I-channel data and second Q-channel data, respectively;

second multiplying means for multiplying said second I-channel data by a predetermined accumulation limiting value;

estimating means for receiving said second Q-channel data and output of said second multiplying means, and estimating an I-level value closest to said second I-channel data in response to a predetermined residual phase error, to produce an estimated I-level value;

phase error deciding means for receiving the estimated I-level value, second I-channel data, and said second Q-channel data, and applying a weight value according to a predetermined weighting function to the difference between said second I-channel data and said estimated I-level value, depending on the directionality of said second Q-channel data, to produce as an output a phase error value;

dividing means for dividing the phase error value output from said phase error deciding means by a predetermined value and outputting said divided phase error value;

accumulating means for accumulating said divided phase error value output from said dividing means;

sine and cosine table storing means for outputting previously stored sine and cosine values to said first multiplying means based upon accumulated phase error values in said accumulating means; and accumulation limiting means for receiving said estimated I-level value and said second I-channel data, and subtracting said estimated I-level value from said second I-channel data, to output the difference as an accumulation limiting value to said second multiplying means.

10. The phase tracking loop as claimed in claim 9, wherein said phase error deciding means decides said phase error value according to the following equation:

$\theta = sgn(Q'') \cdot (I''-\hat{I})$ wherein $\hat{I}$ is the estimated I-level value, I" is the second I-channel data, and Q" is the second Q-channel data.

11. The phase tracking loop as claimed in claim 9, wherein said phase error deciding means decides said phase error value according to the following equation:

$\theta = sgn(Q'') \cdot sgn(I''-\hat{I})$ wherein $\hat{I}$ is the estimated I-level value, I" is the second I-channel data, and Q" is the second Q-channel data.

12. The phase tracking loop as claimed in claim 9, wherein said phase error deciding means selects the weight value obtained from the weighting function W(I) according to the following equation by said phase error value:

$$W(I) = \begin{cases} 1, & |I - \hat{I}| \leq \Delta I \\ 0, & \text{otherwise} \end{cases}$$

where $\hat{I}$ is the estimated I-level value, I is the second I-channel data, and $\Delta I$ is an adjustable threshold value.

13. The phase tracking loop as claimed in claim 9, wherein said phase error deciding means selects the weight value obtained from the weighting function W(I) according to the following equation by said phase error value:

$W(I) = 1 - |I - \hat{I}| = 1 - (I - \hat{I}) \cdot sgn(I - \hat{I});$ where $\hat{I}$ is the estimated I-level value and I is the second I-channel data.

14. The phase tracking loop as claimed in claim 9, wherein said phase error deciding means selects the weight value obtained from the weighting function W(I) according to the following equation by said phase error value:

$$W(I) = \begin{cases} k, & |I - \hat{I}| \geq \Delta I \\ 1 + \dfrac{k-1}{\Delta I} \cdot |I - \hat{I}|, & \text{otherwise} \end{cases}$$

where k is a real number between 0 and 1, and $\hat{I}$ is the estimated I-level value, I is the second I-channel data, and $\Delta I$ is an adjustable threshold value.

15. The phase tracking loop as claimed in claim 9, wherein said phase error deciding means selects the weight value obtained from the weighting function W(I) according to the following equation by said phase error value:

$$W[I] = \begin{cases} 1, & |I - \hat{I}| \leq \Delta I_1 \\ k, & |I - \hat{I}| \geq \Delta I \\ \dfrac{k-1}{\Delta I - \Delta I_1} \cdot |I \mp \Delta I_1 - \hat{I}| + 1, & \text{otherwise} \end{cases}$$

where k is a real number between 0 and 1, $\hat{I}$ is the estimated I-level value, I is the second I-channel data, and $\Delta I$ is an adjustable threshold value.

16. The phase tracking loop as claimed in claim 9, wherein said accumulation limiting means receives said estimated I-level value and said second I-channel data, subtracts said estimated I-level value from said second I-channel data, and outputs a value within an accumulation range which is closest to said difference value as an accumulation limiting value when the absolute value of said second I-channel data is a reference value or above, and outputting said difference value as an accumulation value when the absolute value of said second I-channel data is below said reference value.

17. The phase tracking loop as claimed in claim 9, wherein said phase error deciding means comprises a filter having a response corresponding to said predetermined weighting function.

18. The phase tracking loop as claimed in claim 17, wherein said accumulating means comprises a high-order filter when said weighting function is a high-order function.

* * * * *